W. S. HAMM.
LANTERN FRAME.
APPLICATION FILED AUG. 8, 1907.
1,008,459.
Patented Nov. 14, 1911.
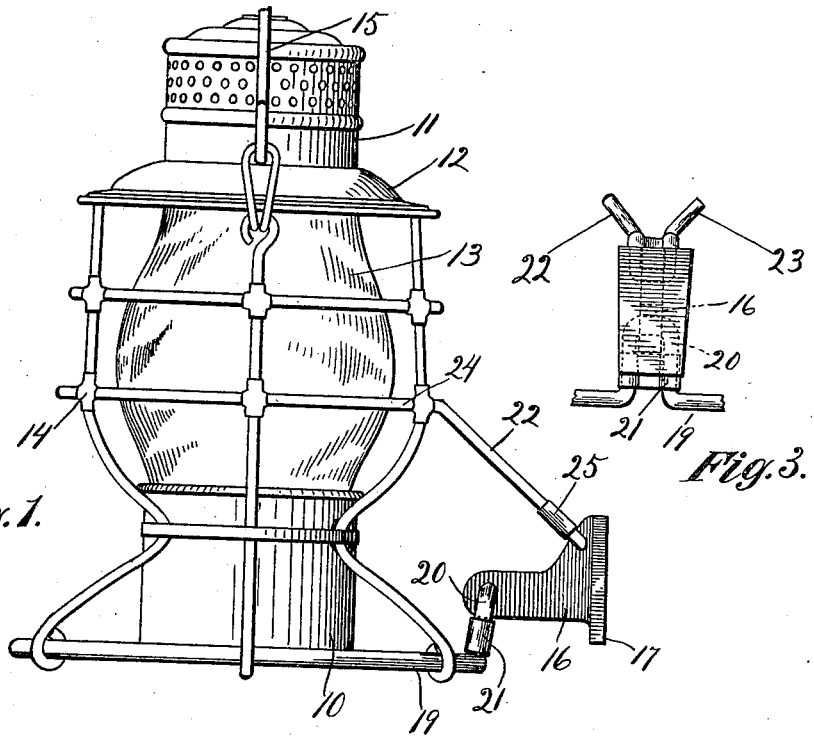
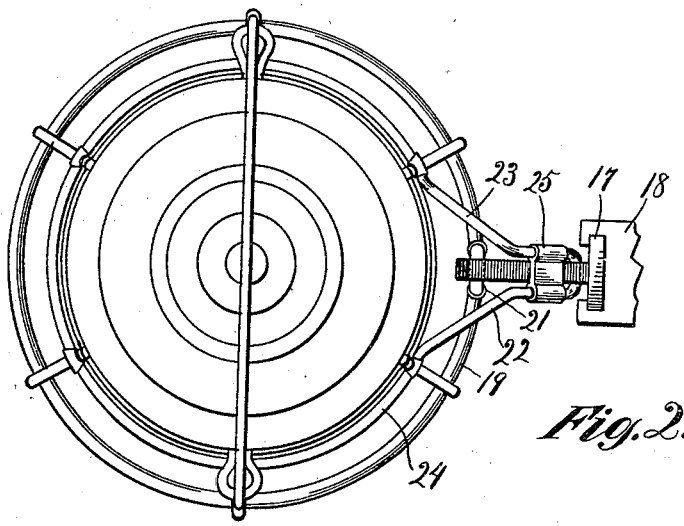
Witnesses:
W. H. Cotton
Charles B. Gillson
Inventor.
William S. Hamm
By Louis K. Gieson, Atty.

UNITED STATES PATENT OFFICE.

WILLIAM S. HAMM, OF HUBBARD WOODS, ILLINOIS, ASSIGNOR TO THE ADAMS & WEST-LAKE COMPANY, OF CHICAGO, ILLINOIS, A CORPORATION OF ILLINOIS.

LANTERN-FRAME.

1,008,459.  Specification of Letters Patent.  Patented Nov. 14, 1911.

Application filed August 8, 1907. Serial No. 387,723.

*To all whom it may concern:*

Be it known that I, WILLIAM S. HAMM, a citizen of the United States, and resident of Hubbard Woods, county of Cook, and State of Illinois, have invented certain new and useful Improvements in Lantern-Frames, of which the following is a specification, and which are illustrated in the accompanying drawings, forming a part thereof.

The invention relates to the guard-frame cage for hand lanterns, its purpose being to provide a bracket attached to the cage which will afford means for supporting a lantern from a wall; the invention consisting in the device hereinafter described and which is illustrated in the accompanying drawings, in which,—

Figure 1 is a side elevation of the lantern; Fig. 2 is a plan view of the same; and Fig. 3 is a detail of the bracket.

The lantern is of any ordinary form, being provided with a guard hoop or cup 10 and dome 11, with crown flange 12, a globe 13, a wire guard-frame cage 14, and a bail or handle 15.

The bracket 16 is preferably of cast metal, and has a vertical wall-plate 17 adapted to engage a socket plate 18 which may be attached to a wall, as, for example, the side of a car. The body portion of the bracket 16 is attached to a part of the cage 14 of the lantern, as shown, to its base ring 19. Preferably, this base ring is looped upwardly, as shown at 20, the loop passing through the bracket 16, and a band 21 being passed around the loop 20 for the purpose of preventing it from spreading and also more securely holding the bracket in position.

A pair of stay rods 22, 23, lead from the body of the bracket to the upper portion of the cage, preferably to one of its rings, and, as shown, they are formed integral with one of the cage rings, as 24. A band 25 may be passed around the stay rods adjacent their connection with the bracket 16, for the purpose of giving added strength and more securely positioning the bracket.

I claim as my invention—

1. In a lantern, in combination, a wire guard frame cage, and a wall bracket, elements of the cage being extended to form stays for the bracket.

2. In a lantern, in combination, a wire guard frame cage, a bracket block adapted for engagement with a wall socket, and rigid stays fixedly attaching the block to various portions of the cage.

3. In combination, a lantern guard-frame cage comprising upper and lower guard rings having extension loops, and a wall bracket attached to such loops.

4. In combination, a lantern guard-frame cage comprising upper and lower guard rings, the lower guard ring being looped upwardly and the upper guard ring being looped laterally, and a wall bracket attached to the loops of the guard rings.

WILLIAM S. HAMM.

Witnesses:
  G. L. WALTERS.
  LOUIS V. EGGERT.

Copies of this patent may be obtained for five cents each, by addressing the "Commissioner of Patents, Washington, D. C."